United States Patent Office 3,017,379
Patented Jan. 16, 1962

3,017,379
CROSS-LINKING OF POLY(VINYL CHLORIDE)
George B. Feild, New Castle, Del., assignor to Hercules Powder Company, Wilmington, Del., a corporation of Delaware
No Drawing. Filed June 30, 1960, Ser. No. 39,817
3 Claims. (Cl. 260—41)

This invention relates to the cross-linking of poly(vinyl chloride).

It is known to cross-link poly(vinyl chloride) by radioactive irradiation to improve its properties. A more practical means of cross-linking is desired.

In accordance with the present invention it has now been found that poly(vinyl chloride) is cross-linked by heating poly(vinyl chloride) with pentaerythritol, in the presence of zinc oxide and dicumyl peroxide or its homologs.

The process of this invention is carried out by mixing poly(vinyl chloride) with the pentaerythritol, zinc oxide and dicumyl peroxide as essential ingredients and other ingredients of the composition to form a blend, shaping the composition, and curing by heating at a temperature in the range of about 300° F. to 450° F. preferably 350° F. to 400° F. for a period of time in the range of 0.5 to 60 minutes for cross-linking to take place. A slow cure at about 350° F. is preferred to a rapid cure at 400° F. in most cases.

The composition containing the essential components may be made without a plasticizer using comminuted ingredients as an aid in the initial mixing or using a plasticizing solvent for the poly(vinyl chloride) which is subsequently evaporated. However, it is preferable to use a plasticizer. Suitable plasticizers are any of the many known plasticizers for poly(vinyl chloride). Particularly good plasticizers are esters of dibasic carboxylic acids and alcohols of 8 to 18 carbon atoms. Suitable plasticizers include tricresyl phosphate, trioctyl phosphate, diisooctyl phthalate, octyl decyl phthalate, diisooctyl adipate, dioctyl azelate, and dioctyl sebacate. The poly(vinyl chloride) composition may be mixed as a plastisol before heating to cure or it may be completely plasticized to form a homogeneous composition and subsequently be heated to effect cure.

In the process of this invention, the pentaerythritol appears to enter into the cross-linking reaction under the influence of the zinc oxide which likewise may enter into the cross-linking reaction or act simply as a promoter for the condensation. The dicumyl peroxide acts as a catalyst for the reaction. To overcome acidity in the composition, carbonates or bicarbonates of alkali metals or alkaline earth metals may advantageously also be added. Calcium carbonate, for example, enhances the cross-linking activity by preventing acid catalyzed decomposition of the dicumyl peroxide by acid liberated from the poly(vinyl chloride).

The pentaerythritol and zinc oxide are used in a weight ratio of 10:1 to 4:1, preferably about 7:1, and the combination of pentaerythritol and zinc oxide is used in such an amount that the pentaerythritol contained therein is in the range of 6-12 parts pentaerythritol per hundred of the poly(vinyl chloride). The dicumyl peroxide is used in the range of ½ to 6 parts per hundred of poly(vinyl chloride), but preferably 2 to 4 parts.

The following examples illustrate the manner of carrying out the process of this invention for producing useful compositions and the manner of effecting the cure of the composition. All parts and percentages are by weight.

EXAMPLES

In the examples illustrated here poly(vinyl chloride) of plastisol grade (Geon 121) was stirred at room temperature into a mixture of the plasticizer, the pentaerythritol and zinc oxide mixture, and other dry ingredients. Where a filler was used, it was also added at this stage. The mixing was completed with a high powered stirrer. A two-roll mill at 250° F. was useful particularly with a filled composition. The composition was sheeted on a two roll mill at about 250° F., whether initially processed as a plastisol or milled, and cured between heated aluminum plates under a hydraulic pressure of 700-800 p.s.i. to a thickness of 75 mils. Physical properties were determined on samples cut from the cured sheets.

Cross-linking may be shown by increased zero strength, temperature, and by decreased Tinius-Olsen flow data expressed as inches flow per minute. Only the latter data are set forth for uniformity in the following examples.

Table

| Example | 1a | 1b | 1c | 1d | 2a | 2b | 3 | 4 | 5a | 5b |
|---|---|---|---|---|---|---|---|---|---|---|
| Polyvinyl chloride | 100 | 100 | 100 | 100 | 100 | 100 | 100 | 100 | 100 | 100 |
| Octyl decyl phthalate | 50 | 50 | 50 | 50 | 50 | 50 | 50 | 50 | 50 | 50 |
| Magnesium oxide | 6 | 6 | 6 | 6 | | | | | | |
| Plumb-O-Sil B [1] | 5 | | | 5 | | | | | | |
| Dibasic lead stearate | 1 | | | 1 | | | | | | |
| Zinc oxide, 1 part; pentaerythritol, 7 parts | | 7 | | 7 | 8 | 8 | 8 | 12 | 8 | 8 |
| Dicumyl peroxide | 0 | 0 | 4 | 4 | 0 | 2 | 4 | 4 | 0 | 4 |
| Sterling MT carbon black | | | | | 50 | 50 | 50 | 50 | 100 | 100 |
| Cure (minutes/° F.) | 60/300 | 60/300 | 60/300 | 60/300 | 15/350 | 15/350 | 15/350 | 5/400 | 15/350 | 15/350 |
| Tinius-Olsen flow (in./min.) | 1.13 | 1.25 | 1.06 | 0.37 | 0.78 | 0.58 | 0.20 | 0.08 | 0.64 | 0.06 |

| Example | 6a | 6b | 7 | 8 | 9 | 10 | 11 | 12 | 13a | 13b |
|---|---|---|---|---|---|---|---|---|---|---|
| Polyvinyl chloride | 100 | 100 | 100 | 100 | 100 | 100 | 100 | 100 | 100 | 100 |
| Octyl decyl phthalate | 50 | 50 | 50 | 50 | 50 | 50 | 50 | 50 | 50 | 50 |
| Calcium carbonate | | | | | | | 3.5 | 3.5 | 3.5 | 0 |
| Zinc oxide, 1 part; pentaerythritol, 7 parts | 6 | 6 | 6 | 6 | 8 | 8 | 6 | 8 | 24 | 24 |
| Dicumyl peroxide | 0 | 0.5 | 1.0 | 2.0 | 4 | 4 | 2 | 2 | 2 | 0 |
| Cure (minutes/° F.) | 15/350 | 15/350 | 15/350 | 15/350 | 55/325 | 55/325 | 15/350 | 15/350 | 5/400 | 5/400 |
| Tinius-Olsen flow (in./min.) | 0.80 | 0.62 | 0.60 | 0.21 | 0.33 | 0.25 | 0.21 | 0.67 | 2.0 | 1.22 |

[1] Complex of lead ortho silicate and silica gel (51% Pb).

Example 1 shows by Tinius-Olsen flow data that pentaerythritol and zinc oxide do not cross-link when dicumyl peroxide is absent (compare 1b with 1d) and that dicumyl peroxide does not cause cross-linking when pentaerythritol and zinc oxide are absent (compare 1a and 1c with 1d), while cross-linking does take place (1d) when these components are present in combination.

Examples 2–5 show filled compositions in which cross-linking is effected by the combination of pentaerythritol, zinc oxide and dicumyl peroxide. In these examples, 2a and 5a are blanks lacking the dicumyl peroxide catalyst so as to provide a basis for comparing Tinius-Olsen flow.

Examples 6a and b, 7 and 8 show the effect of dicumyl peroxide level on cross-linking as indicated by Tinius-Olsen flow data. The change in degree of cross-linking is greatest between 1.0 and 2.0 parts per hundred of resin.

Examples 9 and 10 exemplify plastisol formulations and milled formulations, respectively, using in each case a plastisol grade poly(vinyl chloride). The results indicate about equivalent cross-linking in each case.

Examples 11, 12, 13a and 13b show the effect of an excess of pentaerythritol in combination with zinc oxide. While 6 parts pentaerythritol-zinc oxide mixture gives a product having a Tinius-Olsen flow of 0.21 inch per minute, 8 parts pentaerythritol-zinc oxide mixture gives a product having a Tinius-Olsen flow of 0.67 inch per minute indicating that the larger amount of pentaerythritol gave less cross-linking. Similarly, in Example 13a, 24 parts pentaerythritol-zinc oxide mixture gave a product of such high Tinius-Olsen flow as to indicate that the pentaerythritol was present in such an excess as to provide one pentaerythritol for each bond instead of one pentaerythritol for every two bonds as would be the case in a cross-linking reaction. A comparison of the Tinius-Olsen flow for the products of 13a and 13b in which no catalyst was used further indicates that there was a reaction product in 13a even though not a cross-linking reaction.

While the above examples used a plastisol grade of poly(vinyl chloride) so as to show comparisons more exactly, the poly(vinyl chloride) may be a plastic grade if the compositions are to be produced by mixing and milling operations. Cross-linking by the process of this invention is equally adaptable to either type of poly(vinyl chloride).

The cross-linking process of this invention greatly improves the heat resistance of the poly(vinyl chloride), and the cross-linked poly(vinyl chloride) compositions are advantageously used in protective coatings of many sorts, particularly in the coating of wires for use in electrical work.

When bis($\alpha,\alpha$-dimethyl-p-methyl) peroxide and bis-($\alpha,\alpha$-dimethyl-p-isopropyl) peroxide were substituted for dicumyl peroxide in the above examples, improvements of similar magnitude were obtained.

The homologs of dicumyl peroxide which are included in the scope of the present invention are all peroxides of the formula

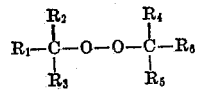

in which $R_1$ and $R_6$ are phenyl and lower alkyl substituted phenyl and $R_2$, $R_3$, $R_4$, and $R_5$ are hydrogen or lower alkyl, said lower alkyl containing 1 to 4 carbon atoms. The preferred peroxides are those in which $R_2$, $R_3$, $R_4$, and $R_5$ are lower alkyl, and the preferred example of this group is dicumyl peroxide. Specific preferred peroxides of this invention besides dicumyl peroxide are: bis($\alpha,\alpha$-dimethyl-p-methylbenzyl) peroxide and bis($\alpha,\alpha$-dimethyl-p-isopropylbenzyl) peroxide which are higher homologs of dicumyl peroxide.

What I claim and desire to protect by Letters Patent is:

1. The method of curing poly(vinyl chloride) which comprises heating poly(vinyl chloride) in contact with ½ to 6 percent of a peroxide of the formula

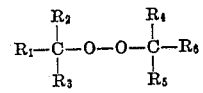

in which $R_1$ and $R_6$ are selected from the group consisting of phenyl and lower alkyl substituted phenyl, and $R_2$, $R_3$, $R_4$, and $R_5$ are selected from the group consisting of hydrogen and lower alkyl radicals, said lower alkyl containing 1 to 4 carbon atoms, and 6 to 12 percent of pentaerythritol, and zinc oxide in the pentaerythritol-zinc oxide weight ratio of 10:1 to 4:1 at a temperature in the range of about 300° F. to about 450° F., said percents being expressed as parts per hundred poly(vinyl chloride) by weight.

2. The method of curing poly(vinyl chloride) which comprises heating poly(vinyl chloride) in contact with ½ to 6 percent dicumyl peroxide, 6 to 12 percent of pentaerythritol, and zinc oxide in the pentaerythritol-zinc oxide weight ratio of 10:1 to 4:1 at a temperature in the range of about 300° F. to about 450° F., said percents being expressed as parts per hundred poly(vinyl chloride) by weight.

3. The method of curing poly(vinyl chloride) which comprises heating poly(vinyl chloride) in contact with 2 to 4 percent dicumyl peroxide, 6 to 12 percent of pentaerythritol, and zinc oxide in the pentaerythritol-zinc oxide weight ratio of 7:1 at a temperature in the range of about 350° F. to about 400° F., said percents being expressed as parts per hundred poly(vinyl chloride) by weight.

References Cited in the file of this patent
UNITED STATES PATENTS
2,958,672     Goldberg _____ Nov. 1, 1960

OTHER REFERENCES

Zimmerman et al.: "Compounding of Polyvinyl Chloride," Rubber Age, volume 68, No. 3, pages 311–318, December 1950.